United States Patent
Deneszczuk et al.

(10) Patent No.: US 10,215,237 B2
(45) Date of Patent: Feb. 26, 2019

(54) MULTIPLE-PIECE BACKING PLATE HAVING PARTS MADE OF DIFFERENT MATERIALS

(71) Applicant: GM GLOBAL TECHNOLOGY OPERATIONS LLC, Detroit, MI (US)

(72) Inventors: Gregory W. Deneszczuk, Royal Oak, MI (US); Manuel Martinez Sanchez, Pontiac, MI (US)

( * ) Notice: Subject to any disclaimer, the term of this patent is extended or adjusted under 35 U.S.C. 154(b) by 115 days.

(21) Appl. No.: 15/223,402

(22) Filed: Jul. 29, 2016

(65) Prior Publication Data

US 2018/0031050 A1 Feb. 1, 2018

(51) Int. Cl.
| | |
|---|---|
| *F16D 13/64* | (2006.01) |
| *F16D 25/00* | (2006.01) |
| *F16D 28/00* | (2006.01) |
| *F16D 13/70* | (2006.01) |
| *F16D 13/52* | (2006.01) |

(52) U.S. Cl.
CPC ........... *F16D 13/648* (2013.01); *F16D 13/70* (2013.01); *F16D 25/00* (2013.01); *F16D 28/00* (2013.01); *F16D 13/52* (2013.01); *F16D 2200/00* (2013.01)

(58) Field of Classification Search
CPC .......................... F16D 13/648; F16D 2200/00
See application file for complete search history.

(56) References Cited

U.S. PATENT DOCUMENTS

| | | | |
|---|---|---|---|
| 3,941,221 A | 3/1976 | Pringle | |
| 4,020,937 A | 5/1977 | Winter | |
| 5,234,090 A | 8/1993 | Haka | |
| 5,511,644 A | 4/1996 | Murata | |
| 5,701,976 A * | 12/1997 | Kumagai | F16D 55/40 188/71.5 |
| 5,901,826 A | 5/1999 | Datta | |
| 6,206,158 B1 | 3/2001 | Mueller | |

(Continued)

FOREIGN PATENT DOCUMENTS

| | | | |
|---|---|---|---|
| FR | 2533005 A1 | 3/1984 | |
| GB | 902093 A | 7/1962 | |
| GB | 1310550 A * | 3/1973 | ............... C23C 4/18 |

OTHER PUBLICATIONS

U.S. Application Filing date Jul. 29, 2016; U.S. Appl. No. 15/223,448, Applicant: GM Global Technology Operations LLC; Title: Backing Plate Providing Axial Stiffness.

*Primary Examiner* — Stacey A Fluhart

(57) ABSTRACT

A multiple-piece backing plate and a friction clutch assembly for an automotive transmission are provided. The multiple-piece backing plate includes a cap part and a main body backing plate. The cap part is formed of a first material. The main body backing plate is attached to the cap part, and the main body backing plate is formed of a second material, where the second material is different than the first material. The friction clutch assembly includes first clutch plates coupled to a first transmission member and second clutch plates interleaved with the first clutch plates and coupled to a second transmission member. The friction clutch assembly is configured to be moved between an engaged position and a disengaged position. In the engaged position, the first and second transmission members are coupled together by compressing the first and second clutch plates directly against the cap part.

20 Claims, 2 Drawing Sheets

(56) References Cited

U.S. PATENT DOCUMENTS

| | | |
|---|---|---|
| 7,063,197 B2 | 6/2006 | Merkel |
| 8,479,907 B2 | 7/2013 | Schneegans |
| 8,821,336 B2 | 9/2014 | Wilton |
| 8,844,699 B2 | 9/2014 | Schömig |
| 8,932,169 B2 | 1/2015 | Paciotti |
| 2003/0141163 A1 | 7/2003 | Doremus |
| 2004/0079607 A1 | 4/2004 | Osman |
| 2005/0000776 A1* | 1/2005 | Merkel ................. F16D 13/648 192/109 R |
| 2011/0139567 A1* | 6/2011 | Hauck ................... F16D 13/648 192/70.11 |
| 2013/0310211 A1* | 11/2013 | Wilton .................... F16D 13/70 475/276 |
| 2015/0362022 A1 | 12/2015 | Heitzenrater |
| 2015/0369302 A1* | 12/2015 | Takabayashi ........... F16D 13/52 192/70.12 |
| 2016/0178015 A1 | 6/2016 | Mordukhovich |
| 2016/0245344 A1 | 8/2016 | Heitzenrater |
| 2017/0241485 A1* | 8/2017 | Piper ...................... F16D 11/14 |

* cited by examiner

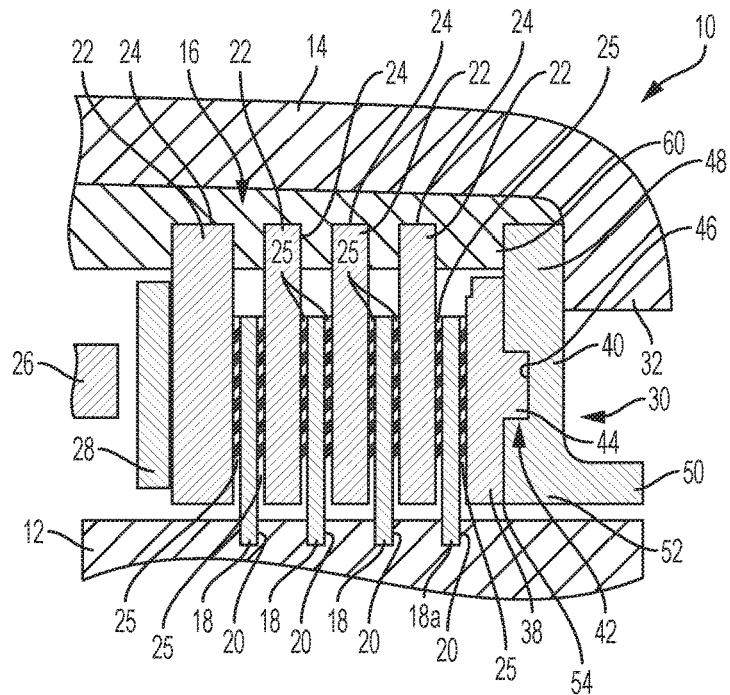
FIG. 1
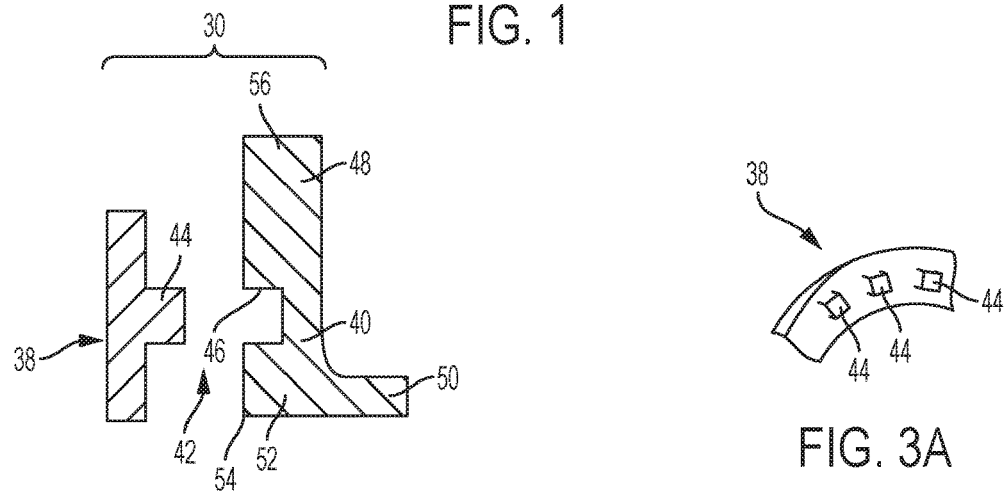
FIG. 2
FIG. 3A
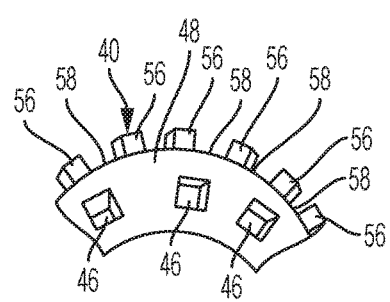
FIG. 3B

MULTIPLE-PIECE BACKING PLATE HAVING PARTS MADE OF DIFFERENT MATERIALS

FIELD

The present disclosure relates to friction clutch pack assemblies used in automatic motor vehicle transmissions, and more particularly, to a multiple-piece backing plate for a friction clutch pack assembly.

INTRODUCTION

A typical multiple speed transmission uses a combination of friction clutches, planetary gear arrangements, and fixed interconnections to achieve a plurality of gear ratios. The number and physical arrangement of the planetary gear sets, generally, is dictated by packaging, cost and desired speed ratios.

Friction clutch pack assemblies for engaging and disengaging various gears within a transmission typically include interleaved clutch plates that are compressed against a backing plate. The backing plate is expected to act as a stiff member against which the clutch plates can be compressed. Accordingly, backing plates are typically relatively thick and heavy, as compared to the clutch plates, to provide the required axial stiffness. In addition, backing plates are typically formed of steel because the friction material on the end clutch plate interacts well with steel to essentially prevent slippage when the friction clutch assembly is engaged.

Governmental regulations and/or consumer demands require that vehicle components continue to become lighter and cheaper, however, the backing plate must still be capable of providing a certain amount of axial stiffness against which the friction clutch plates can be compressed to provide an effective coupling between transmission components, and the backing plate must be able to cooperate with the end clutch plate to effectively present slippage when the clutch assembly is engaged. Therefore, there exists a need for new and improved backing plates that have better performance while meeting government and consumer requirements.

SUMMARY

The present disclosure provides a multiple-piece backing plate for a friction clutch assembly that combines a back piece made of a light weight material with a front piece made of a material, such as steel, that can interact well with a friction clutch plate to essentially prevent slippage when the clutch assembly is engaged.

In one form, which may be combined with or separate from the other forms disclosed herein, a friction clutch assembly for an automatic transmission is provided. The friction clutch assembly includes a plurality of first clutch plates coupled to a first transmission member and a plurality of second clutch plates interleaved with the plurality of first clutch plates. The plurality of second clutch plates is coupled to a second transmission member. A multiple-piece backing plate is provided that includes a cap part and a main body backing plate. The cap part is disposed adjacent to the pluralities of first and second clutch plates, and the cap part is formed of a first material. The main body backing plate is attached to the cap part, and the main body backing plate is formed of a second material. The second material is different than the first material. The friction clutch assembly is configured to be moved between an engaged position and a disengaged position. In the engaged position, the first and second transmission members are coupled together by compressing the pluralities of first and second clutch plates directly against the cap part, where an end clutch plate is compressed against and directly into contact with the cap part when the friction clutch assembly is in the engaged position.

In another form, which may be combined with or separate from the other forms disclosed herein, a multiple-piece backing plate is provided for use in a friction clutch assembly that is configured to be engaged and disengaged. The multiple-piece backing plate includes a cap part configured to contact a clutch plate of the friction clutch assembly. The cap part is formed of a first material. A main body backing plate is attached to the cap part, and the main body backing plate is formed of a second material. The second material is different than the first material.

In yet another form, which may be combined with or separate from the other forms disclosed herein, a multiple-piece backing plate is provided for use in a friction clutch assembly that is configured to be engaged and disengaged. The multiple-piece backing plate includes a cap part configured to contact a clutch plate of the friction clutch assembly and a main body backing plate attached to the cap part through a castle joint.

Additional features may optionally be provided in connection with any of the forms described above, such as: the main body backing plate being formed of aluminum; the main body backing plate being formed by a powder metal process; the main body backing plate being formed by stamping; the main body backing plate being formed from a stamped material; the main body backing plate being formed by casting; the cap part being formed of one of the following: steel or a steel alloy; the cap part being formed from a stamped steel or steel alloy; the main body backing plate being splined to one of the first and second transmission members; in the engaged position, the first and second pluralities of clutch plates being free from contact with the main body backing plate; the cap part being disposed outside of each spline of the first and second transmission members; the friction clutch assembly further comprising an actuator disposed on one side of the pluralities of first and second clutch plates; the actuator configured to compress the pluralities of first and second clutch plates into the engaged position; the actuator being one of electric, hydraulic and pneumatic; a face of each of the first and second clutch plates bearing friction material thereon; and the cap part being attached to the main body backing plate through a castle joint.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a cross-sectional view of a portion of an automatic transmission having a friction clutch assembly and a multiple-piece backing plate, in accordance with the principles of the present disclosure;

FIG. 2 is an exploded cross-sectional view of the multiple-piece backing plate shown in FIG. 1, according to the principles of the present disclosure;

FIG. 3A is a perspective view of a portion of one piece, a cap part, of the multiple-piece backing plate shown in FIGS. 1-2, in accordance with the principles of the present disclosure;

FIG. 3B is a perspective view of a portion of another piece, a main body backing plate, of the multiple-piece backing plate shown in FIGS. 1-2, according to the principles of the present disclosure;

DETAILED DESCRIPTION

Figure 4:
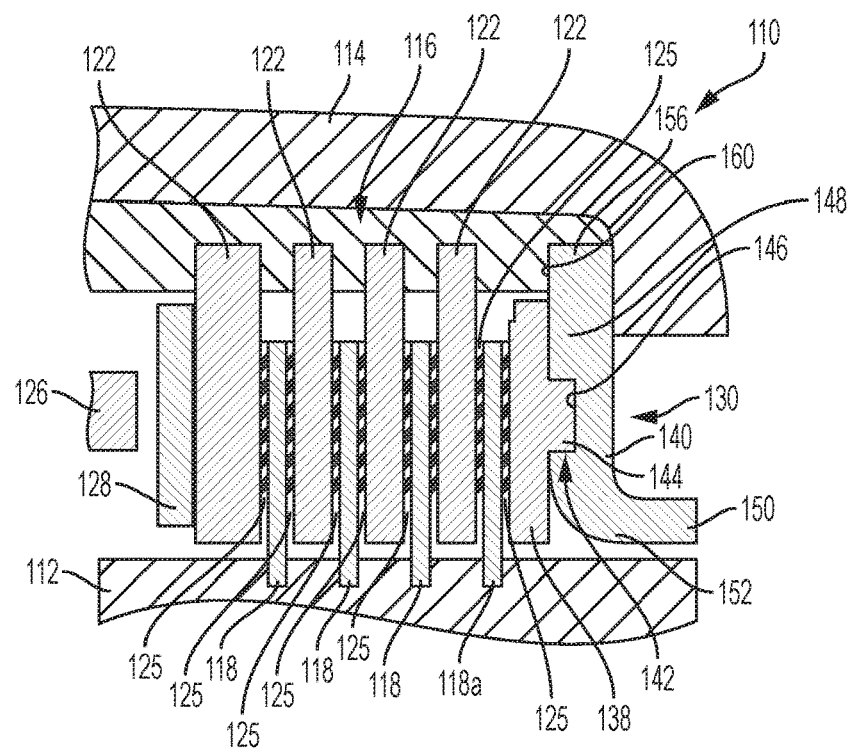
FIG. 4 is a cross-sectional view of a portion of an automatic transmission having another friction clutch assembly and another multiple-piece backing plate, in accordance with the principles of the present disclosure.

The following description is merely exemplary in nature and is not intended to limit the present disclosure, its application, or uses.

With reference to FIG. 1, an illustration of a portion of an automotive transmission is illustrated and generally designated at 10. The transmission 10 may include a plurality of planetary gear assemblies, which are generally not shown, but one of more gears of which may be coupled to a hub 12 and/or a housing 14. The housing 14 may be a clutch housing or a transmission case, by way of example. Either transmission component 12, 14 may be rotating or stationary. Operably disposed between the hub 12 and the housing 14 is a friction clutch assembly 16 configured to selectively couple the hub 12 (and any planetary gear elements, shafts, or stationary elements coupled to the hub 12) to the housing 14 (and any planetary gear elements, shafts, or stationary elements coupled to the housing 14).

The friction clutch assembly 16 includes a first plurality of smaller diameter clutch plates or discs 18 which are coupled by interengaging male and female splines 20 to the hub 12, which is an inner torque carrying member. A second plurality of larger diameter friction clutch plates or discs 22 are coupled by interengaging male and female splines 24 to the clutch housing 14, which is an outer generally annular torque carrying member. The second clutch plates 22 are interleaved with the first clutch plates 18. In accordance with conventional friction clutch practice, at least one face of the friction clutch plates or discs 18, 22 includes friction material 25 disposed thereon.

At one end of the friction clutch assembly 16 (the left end in the orientation of FIG. 1) is disposed a hydraulic, electric or pneumatic operator or actuator 26, which selectively provides an axial compressive force to the friction clutch assembly 16 to cause torque transfer therethrough and to move the friction clutch assembly 16 into an engaged position. The actuator 26 may apply a force to a pressure plate 28 to compress the first and second clutch plates 18, 22 together. A spring (not shown) may be configured to return the friction clutch assembly 16 to a disengaged position when the actuator 26 is released.

At the other end of the friction clutch pack or assembly 16 (the right end in the configuration of FIG. 1) is disposed an annular multiple-piece backing plate 30. The multiple-piece backing plate 30 is located and restrained against axial motion away from the operator 26 and the friction clutch assembly 16 by a lip 32 of the housing, in this example, however, it should be understood that other restraint devices could be used, such as a snap ring (not shown), or other similar components.

Referring now to FIGS. 1-2 and 3A-3B the multiple-piece backing plate 30 is illustrated. The multiple-piece backing plate 30 includes a cap part 38, wherein the end clutch plate 18a is configured to be compressed directly against and into contact with the cap part 38 when the friction clutch assembly 16 is in the engaged position. Thus, the cap part 38 is disposed adjacent to the pluralities of first and second clutch plates 18, 22. A main body backing plate 40 is attached to the cap part 38.

The main body backing plate 40 may be attached to the cap part 38 by glue, welding, a roller die, a pin, or an interlocking joint, such as a spline or castle joint, by way of example. In the illustrated example, a castle joint 42 is used to attach the cap part 38 to the main body backing plate 40. The castle joint 42 includes square-shaped, rectangular-shaped, tabs, or any non-circular protrusions 44 extending from the cap part 38. Non-circular corresponding receiving cavities 46 are formed in the main body backing plate 40 to receive the protrusions 44. Though the protrusions 44 extend from the cap part 38 and the receiving cavities 46 are formed in the main body backing plate 40 in this example, it should be understood that the two could be reversed such that the protrusions 44 extend from the main body backing plate 40 and the receiving cavities are formed in the cap part 38.

The main body backing plate 40 has a reaction section 48 that forms the cavities 46 therein and that is attached to the cap part 38. A strength section 50 extends axially from the reaction section 48, the strength section 50 being disposed generally perpendicular to the reaction section 48. A corner section 52 connects the reaction section 48 to the strength section 50. The corner section 52 may have any desired shape in the example of FIGS. 1-2 because the main body backing plate 40 may be formed by casting or from a powder metal process, in this example. As such, in this example, the corner section 52 has a sharp corner 54. The reaction section 48, the corner section 52, and the strength section 50 may be formed unitarily as one-piece from a single piece of a metal, by way of example.

The reaction section 38 may have a plurality of male and female splines 56, 58 extending therefrom. The reaction section 38 may thus be splined to the housing 14 of the transmission 10 thereby attaching the main body backing plate 40 to the housing 14 via splines 60 formed in the housing 14. Accordingly, the main body backing plate 40 is effecting to carry torque. In the illustrated example, the cap part 38 is disposed outside of each spline 60 of the housing 14 (and the hub 12). Thus, torque is transferred through the main body backing plate 40 rather than the cap part 38 that reacts with the friction material 25. In an alternative configuration, the main body backing plate 40 could be disposed outside of the splines 60, and the cap part 38 could be disposed in the splines 60.

Thus, the friction clutch assembly 16 is configured to be moved between an engaged position and a disengaged position. In the engaged position, the actuator 26 compresses the pressure plate 28 against the pluralities of first and second clutch plates 18, 22. The hub 12 and housing 14 are coupled together when the pluralities of first and second clutch plates 18, 22 are compressed directly against the cap part 38. The end clutch plate 18a of one of the first and second pluralities of clutch plates 18, 22 is compressed against and directly into contact with the cap part 38 when the friction clutch assembly 16 is in the engaged position.

In some versions, the cap part 38 is formed of a first material and the main body backing plate 40 is formed of a second material, where the first and second materials are different from each other. (In other variations, however, the cap part 38 and the main body backing plate 40 may be formed of the same material). In one example, the cap part 38, which contacts the end clutch plate 18a and the friction material 25 disposed thereon, is made of a steel or steel alloy which interacts well with the friction material 25 to maintain an essentially non-slipping engagement between the cap part 38 and the end plate 18a when the clutch assembly 16 is engaged. The main body backing plate 40, on the other hand, may be formed of a lighter material, such as aluminum, ceramic, steel or a steel alloy, magnesium, or any other suitable material.

In the engaged position, the first and second pluralities of clutch plates 18, 22 are free from contact with the main body backing plate 40 and thus the aluminum or other light weight material. Accordingly, a material that interlocks well with friction material, such as steel, may be used to contact the friction material 25 of the end plate 18a via the cap part 38, while a light weight material, such as aluminum, makes up the bulk of the multiple-piece backing plate 30 in the main body backing plate 40.

Figure 5:
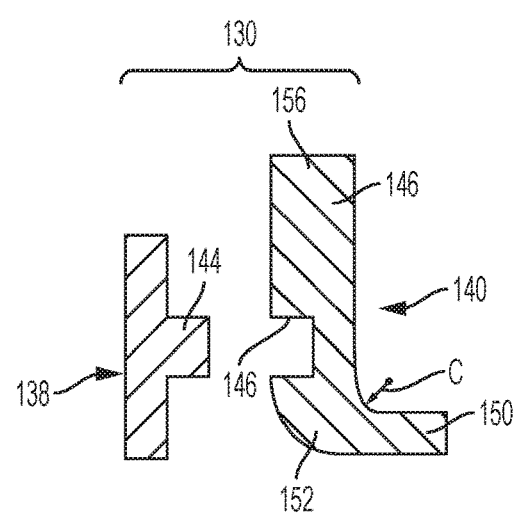
FIG. 5 is an exploded cross-sectional view of the multiple-piece backing plate shown in FIG. 4, according to the principles of the present disclosure.

Referring now to FIGS. 4-5, another automotive transmission is illustrated and generally designated at 110. The transmission 110 may be substantially similar to the transmission 10 described above, and thus, the transmission 110 may include a plurality of planetary gear assemblies, which are generally not shown, but one of more gears of which may be coupled to a hub 112 and/or a housing 114.

Other components of the transmission 110 may be the same as or similar to those described above with respect to the transmission 10 unless described as being different. Thus, the transmission 110 includes a friction clutch assembly 116 having pluralities of first and second clutch plates 118, 122 with friction material 125 disposed thereon, and the clutch assembly 116 may be actuated by an actuator 126.

Like the clutch assembly 16 described above, at one end of the friction clutch pack or assembly 116 (the right end in the configuration of FIG. 4) is disposed an annular multiple-piece backing plate 130. The multiple-piece backing plate 130 includes a cap part 138, which may be substantially similar to the cap part 138 described above. An end clutch plate 118a is configured to be compressed directly against and into contact with the cap part 138 when the friction clutch assembly 116 is in the engaged position. Thus, the cap part 138 is disposed adjacent to the pluralities of first and second clutch plates 118, 122. A main body backing plate 140 is attached to the cap part 138.

The main body backing plate 140 may be attached to the cap part 138 by glue, welding, a roller die, a pin, or an interlocking joint, such as a spline or castle joint, by way of example. In the illustrated example, a castle joint 142 is used to attach the cap part 138 to the main body backing plate 140. Like the castle joint 42 described above, the castle joint 142 may include square-shaped, rectangular-shaped, tabs, or any non-circular protrusions 144 extending from the cap part 138. Non-circular corresponding receiving cavities 146 are formed in the main body backing plate 140 to receive the protrusions 144. There may be slight differences in the castle joint 42 formed by casting or powder metal processes and the castle joint 142 formed when at least one side is a stamped material.

Though the protrusions 144 extend from the cap part 138 and the receiving cavities 146 are formed in the main body backing plate 140 in this example, it should be understood that the two could be reversed such that the protrusions 144 extend from the main body backing plate 140 and the receiving cavities 146 are formed in the cap part 138.

The main body backing plate 140 has a reaction section 148 that forms the cavities 146 therein and that is attached to the cap part 138. A strength section 150 extends axially from the reaction section 148, the strength section 150 being disposed generally perpendicular to the reaction section 148. A corner section 152 connects the reaction section 148 to the strength section 150. The corner section 152 forms a round bend between the reaction section 148 and the strength section 140 having a radius of curvature c.

Thus, the main body backing plate 140 may be formed by stamping a single piece of metal material, such as aluminum; in other words, the main body backing plate 140 may be formed of a stamped material, and formed into a final backing plate shape by stamping. The reaction section 148, the corner section 152, and the strength section 150 may be formed unitarily as one-piece from a single piece of stamped material, by way of example.

The cap part 38, 138 illustrated in any of the figures may also be formed by stamping, or by casting, or powder metal processes, as desired.

The reaction section 138 of the main body backing plate 140 may have a plurality of splines 156 extending therefrom. The reaction section 138 may thus be splined to the housing 114 of the transmission 110 thereby attaching the main body backing plate 140 to the housing 114 via splines 160 in the housing 114. According, the main body backing plate 140 is effecting to carry torque. In the illustrated example, the cap part 138 is disposed outside of each spline 160 of the housing 114 (and the hub 112). Thus, torque is transferred through the main body backing plate 140 rather than the cap part 138 that reacts with the friction material 125. In an alternative configuration, the main body backing plate 140 could be disposed outside of the splines 160, and the cap part 138 could be disposed in the splines 160.

Thus, the friction clutch assembly 116 is configured to be moved between an engaged position and a disengaged position. In the engaged position, the actuator 126 compresses the pressure plate 128 against the pluralities of first and second clutch plates 118, 122. The hub 112 and housing 114 are coupled together when the pluralities of first and second clutch plates 118, 122 are compressed directly against the cap part 138. The end clutch plate 118a of one of the first and second pluralities of clutch plates 118, 122 is compressed against and directly into contact with the cap part 138 when the friction clutch assembly 116 is in the engaged position.

Like the cap part 38 and main body backing plate 40 described above, in some variations, the cap part 138 is formed of a first material and the main body backing plate 140 is formed of a second material, where the first and second materials are different from each other. (In other variations, however, the cap part 38 and the main body backing plate 40 may be formed of the same material). In one example, the cap part 138, which contacts the end clutch plate 118a and the friction material 125 disposed thereon, is made of a steel or steel alloy which interacts well with the friction material 125 to maintain an essentially non-slipping engagement between the cap part 138 and the end plate 118a when the clutch assembly 116 is engaged. The main body backing plate 140, on the other hand, may be formed of a lighter material, such as aluminum, ceramic, steel or a steel alloy, magnesium, or any other suitable material.

In the engaged position, the first and second pluralities of clutch plates 118, 122 are free from contact with the main body backing plate 140 and thus the aluminum or other light weight material. Accordingly, a material that interlocks well with friction material, such as steel, may be used to contact the friction material 125 of the end plate 118a, while a light weight material, such as aluminum, makes up the bulk of the multiple-piece backing plate 130 in the main body backing plate 140.

The main body backing plate 40, 140 and the attached cap part 38, 138 together form an effective two-part backing plate 30, 130 against which the pluralities of first and second clutch plates 118, 122 react. The multiple-piece backing plate 30, 130 functions as a stop or travel limit against which the first and second friction plates or discs 18, 118, 22, 122 are compressed.

The description provided herein is merely exemplary in nature and variations that do not depart from the gist thereof are intended to be within the spirit and scope of the present disclosure. Such variations are not to be regarded as a departure from the spirit and scope of the present disclosure.

What is claimed is:

1. A friction clutch assembly for an automatic transmission comprising, in combination,
    a plurality of first clutch plates coupled to a first transmission member;
    a plurality of second clutch plates interleaved with the plurality of first clutch plates and coupled to a second transmission member;
    a multiple-piece backing plate comprising:
        a cap part disposed adjacent to the pluralities of first and second clutch plates, the cap part being formed of a first metallic material; and
        a main body backing plate attached to the cap part, the main body backing plate being formed of a second material, the second material being different than the first material,
    wherein the friction clutch assembly is configured to be moved between an engaged position and a disengaged position, and wherein in the engaged position, the first and second transmission members are coupled together by compressing the pluralities of first and second clutch plates directly against the cap part, an end clutch plate of one of the first and second pluralities of clutch plates being compressed against and directly into contact with the cap part when the friction clutch assembly is in the engaged position.

2. The friction clutch assembly of claim 1, wherein the main body backing plate is formed of aluminum.

3. The friction clutch assembly of claim 2, wherein the main body backing plate is formed by a powder metal process.

4. The friction clutch assembly of claim 2, wherein the main body backing plate is formed by stamping.

5. The friction clutch assembly of claim 2, wherein the main body backing plate is formed by casting.

6. The friction clutch assembly of claim 2, wherein the cap part is formed of one of the following: steel and a steel alloy.

7. The friction clutch assembly of claim 6, wherein the cap part is formed from a stamped steel or steel alloy.

8. The friction clutch assembly of claim 2, the main body backing plate being splined to one of the first and second transmission members.

9. The friction clutch assembly of claim 8, wherein in the engaged position, the first and second pluralities of clutch plates are free from contact with the main body backing plate.

10. The friction clutch assembly of claim 9, the cap part being disposed outside of each spline such that the cap part does not carry torque.

11. The friction clutch assembly of claim 1, wherein the cap part is attached to the main body backing plate through a castle joint, wherein the castle joint comprises a noncircular protruding member extending axially from one of the main body backing plate and the cap part and portions defining an interlocking receiving member in the other of the main body backing plate the cap part.

12. The friction clutch assembly of claim 1, the cap part being free of nonmetallic friction material attached thereto.

13. The friction clutch assembly of claim 1, the cap part and main body backing plate each being separate pieces that are mechanically interlocked together.

14. A multiple-piece backing plate for use in a friction clutch assembly that is configured to be engaged and disengaged, the multiple-piece backing plate comprising:
    a cap part configured to contact a clutch plate of the friction clutch assembly, the cap part being formed of a first metallic material; and
    a main body backing plate attached to the cap part, the main body backing plate being formed of a second material, the second material being different than the first material.

15. The multiple-piece backing plate of claim 14, wherein the main body backing plate is formed of aluminum.

16. The multiple-piece backing plate of claim 15, wherein the main body backing plate is formed by a powder metal process.

17. The multiple-piece backing plate of claim 15, wherein the main body backing plate is formed by stamping.

18. The multiple-piece backing plate of claim 15, wherein the main body backing plate is formed by casting.

19. The multiple-piece backing plate of claim 15, wherein the cap part is formed of one of the following: steel and a steel alloy, the cap part and main body backing plate each being separate pieces that are mechanically interlocked together, the cap part being free of nonmetallic friction material attached thereto.

20. The multiple-piece backing plate of claim 14, wherein the cap part is attached to the main body backing plate through a castle joint, wherein the castle joint comprises a noncircular protruding member extending axially from one of the main body backing plate and the cap part and portions defining an interlocking receiving member in the other of the main body backing plate the cap part.

* * * * *